United States Patent
Zabeck et al.

[11] Patent Number: 5,915,669
[45] Date of Patent: Jun. 29, 1999

[54] ELECTROMAGNETIC VALVE HAVING A VALVE BODY WITH A SEALING BEAD

[75] Inventors: Sebastian Zabeck, Weinheim; Joachim Heinemann, Groxheimertal; Reinhard Tinz, Gross-Biberau, all of Germany

[73] Assignee: Firma Carl Freudenberg, Germany

[21] Appl. No.: 08/886,491

[22] Filed: Jul. 1, 1997

[30] Foreign Application Priority Data

Jul. 1, 1996 [DE] Germany ............... 196 26 290

[51] Int. Cl.⁶ .................................. F16K 31/02
[52] U.S. Cl. ..................... 251/129.16; 251/129.02; 251/330
[58] Field of Search ............ 251/129.16, 129.02, 251/330; 137/550

[56] References Cited

U.S. PATENT DOCUMENTS

| | | | |
|---|---|---|---|
| 1,151,494 | 8/1915 | Marsh | 251/330 |
| 1,871,072 | 8/1932 | Miller | 251/330 |
| 2,253,372 | 8/1941 | Fischer | 251/330 |
| 2,735,047 | 2/1956 | Garner et al. | 251/129.19 |
| 2,924,233 | 2/1960 | Michaels | 251/330 |
| 3,037,521 | 6/1962 | Larry | 251/330 |
| 4,790,346 | 12/1988 | Kolze et al. | 251/129.19 |
| 5,167,441 | 12/1992 | Alaze et al. | 251/129.02 |
| 5,492,143 | 2/1996 | Cooper et al. | 137/550 |
| 5,496,100 | 3/1996 | Schmid | 251/129.2 |

FOREIGN PATENT DOCUMENTS 885678  11/1981  U.S.S.R. ............... 251/129.19

Primary Examiner—Denise L. Ferensic
Assistant Examiner—John Ball
Attorney, Agent, or Firm—Kenyon & Kenyon

[57] ABSTRACT

An electromagnetic valve particularly suited for use in an internal combustion engine includes a housing, a coil, a magnet armature guided within the coil, and a spring-actuated valve body interacting via a tappet with the magnet armature. The valve body includes a bead disposed on the side of the valve body facing the coil, wherein when the valve is in the completely open state, the bead contacts the coil.

11 Claims, 2 Drawing Sheets

ELECTROMAGNETIC VALVE HAVING A VALVE BODY WITH A SEALING BEAD

FIELD OF THE INVENTION

The invention relates generally to electromagnetic valves, and, more particularly, to an electromagnetic valve for use in an internal combustion engine. The valve has a housing in which are located a coil, a magnet armature guided in the coil, and a spring-actuated valve body.

BACKGROUND OF THE INVENTION

German Patent document DE-OS-44 09 033 discloses a pilot valve having an intermediate rod that is inserted between the magnet armature and the valve plate and is radially guided in the valve housing within longitudinal ribs. The valve plate is radially and axially supported in a ball-socket bearing, the intermediate rod abutting against the magnet armature without radial support. The pilot valve is used particularly in internal combustion engines, for example, in a ventilation device for a fuel tank or as a shutoff valve in a crankcase in a ventilation system.

Such valves are used under harsh conditions, such as in motor vehicles under conditions of air containing dust or oil. As shutoff valves, they must meet high demands with regard to impermeability over a long lifetime, while being maintenance-free. Furthermore, manufacturing this mass-produced product economically must be possible.

Known designs typically include many parts and a complicated geometry. Furthermore, there is the danger that dirt particles can get into the armature guide-region of the magnet armature.

The object of the present invention is to offer better protection against the penetration of dirt particles into the sensitive armature guide-region, while maintaining a simple design with a simple assembly.

SUMMARY OF THE INVENTION

It is the object of the invention to provide an electromagnetic valve with a valve body that includes a bead disposed on the side of the valve body facing the coil. The bead may, for example, be disposed about the rim of the valve body. The bead makes contact with the coil when the valve is in the completely open state. In the open state, which is when the valve experiences the maximum flow-through, a biasing spring presses the valve body against the coil so that the bead of the valve body abuts the coil. In this manner, the bead seals against the coil which, to a great extent, prevents dirt particles from getting into the sensitive armature guide-region between the magnet armature and the coil. In the closed state, the bead does not seal against the coil and thus the armature guide-region is not sealed off. This, however, is not critical since no flow-through takes place when the valve is closed.

The joining of the tappet to the valve body reduces the danger of dirt accumulating in the tappet/valve-body guide-region, and allows for economical production. For example, the valve body and tappet may be produced as an integrated, single-piece construction. The design of the crowned end of the tappet produces the needed compensation for play of the valve seat. Because of the sealing action of the bead abutting against the coil, the contact area of the tappet with the magnet armature is also protected against the penetration of dirt particles.

Additional guidance is achieved, by having the crowned end of the tappet interact with a socket-like receptacle in the magnet armature.

If the length of the valve tappet is less than half the outside diameter of the valve body, additional guidance of the valve tappet may not be necessary because of the short overall length.

The central arrangement of the tappet and its guidance in the magnet armature make it possible to install the valve in a horizontal position. This is not possible when the guidance of the tappet is in the outer region because of increased friction and gravitational deposits of dirt.

When the valve is in the closed position, the valve body seals against a valve seat formed integral with the housing. To produce the seal between the valve body and the valve seat, the valve body has a sealing device, constructed as a separate part. The sealing device may be inserted into the valve body and retained there by a snap-fit or pressure fit arrangement. This allows particularly cost-effective production, since the known sealing device is very flat and fine and must be vulcanized onto the valve body.

The penetration of dirt particles may be further avoided in that a filter may be, for example, slip-fitted on the inlet connection closeable by the valve body.

The inlet or outlet connection may be arranged in the same plane as the valve seat, or in a plane offset in parallel in order to achieve favorable flow characteristics. For example, such a configuration provides fewer deflections, and therefore fewer resistances to flow, resulting in fewer losses of flow.

DETAILED DESCRIPTION OF THE INVENTION

Figure 1:
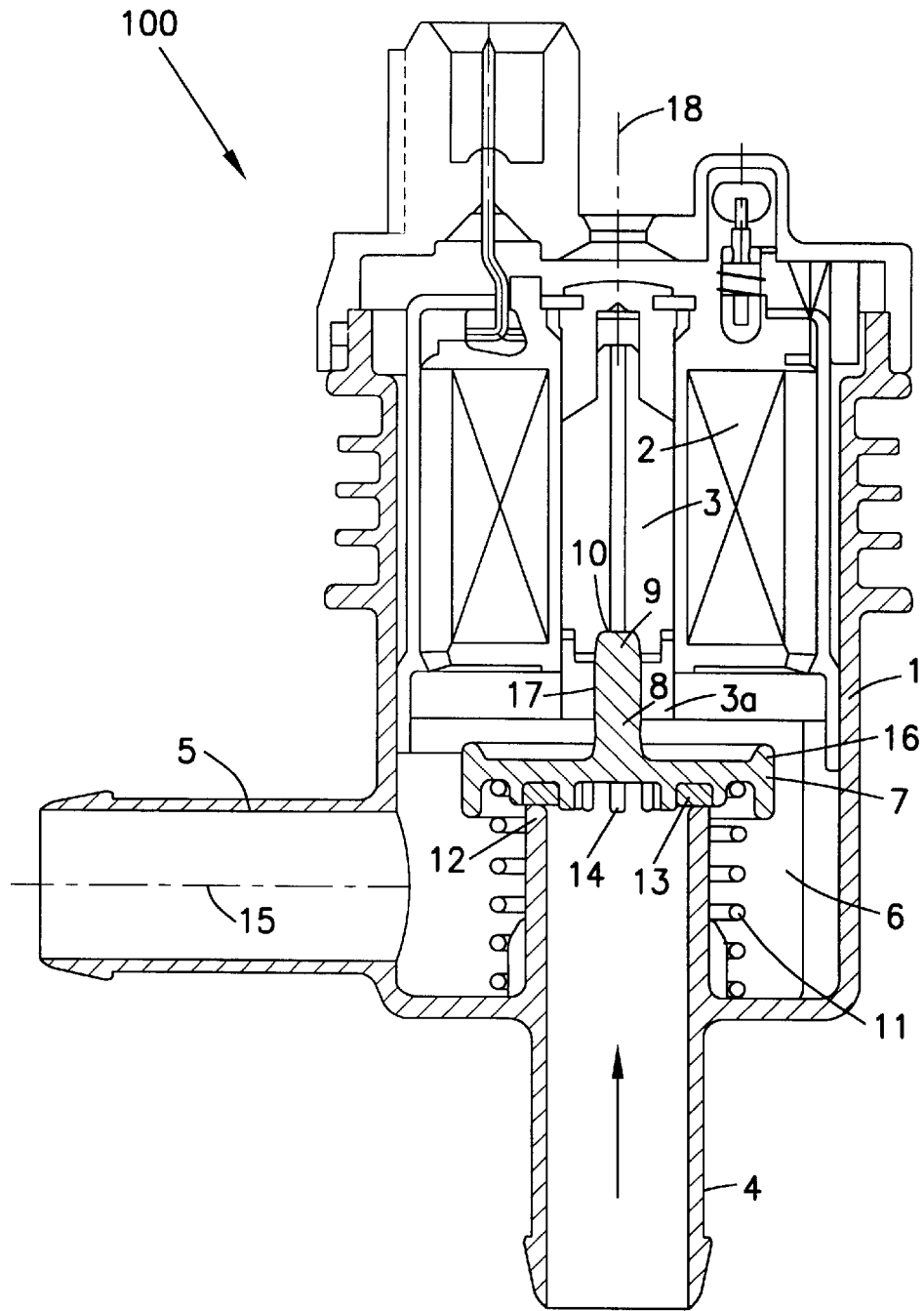
FIG. 1 shows a shutoff valve of a ventilation system for a crankcase according to the invention is shown in the closed position, that is, in a current receiving state.

The electromagnetic valve denoted generally by reference numeral 100 has a housing 1 in which an electric coil 2 is located which surrounds a magnet armature 3. Housing 1 is provided with an inlet connection 4 and an outlet connection 5. Electric coil 2 only partially fills housing 1, so that a space 6 is available in communication with inlet connection 4 and outlet connection 5.

A movable valve body 7 selectively blocks the passageway between inlet connection 4 and the space 6. The valve 100 has only two working states or positions, either completely open or closed. Intermediate positions are not provided. On the side facing coil 2, valve body 7 has an integral tappet 8 which projects through a pole-plate core 3a and comes in contact with an end face of magnet armature 3. The end 9 of tappet 8 is crowned and rests in a socket-like receptacle 10 of magnet armature 3. In principle, magnet armature 3 can also have a flat end face on which the crowned end of tappet 8 rests, since the tappet is guided satisfactorily in pole-plate core 3a. Because of this, the magnet armature 3 can be manufactured more simply. The length of valve tappet 8 may be dimensioned in such a way that it is less than half the outside diameter of valve body 7.

A compression spring 11, arranged around inlet connection 4, provides for a reliable lifting of valve body 7 from the valve seat 12 on inlet connection 4. For example, in the embodiment shown, the spring 11 biases the valve body 7 to the open position when the current supply of electric coil 2 is interrupted. When current is applied to coil 2, the magnet armature 3 is moved in a manner to overcome the biasing spring 11 and sealingly close the valve body 7 on the valve seat 12. Thus, by interrupting the current to coil 2, flow is permitted between inlet connection 4 and outlet connection 5 via space 6.

To close the valve, current is applied to coil 2, as a result of which a force acts on magnet armature 3 in the direction of valve body 7. Magnet armature 3 therefore moves within coil 2 against the spring tension of spring 11 in the direction of valve body 7. The valve body 7 is moved together with the magnet armature 3. The movement stops when valve body 7 sits on the valve seat 12 of inlet connection 4 and seals it by means of sealing device 13.

One of skill in the art will recognize that, for example, the valve 100 may be configured in an alternate embodiment such that a spring 11 may bias the valve 100 closed. In such an alternative, a current may be applied to the coil 2 in order to overcoming the spring 11 and open the valve 100. Therefore, interrupting the current to coil 2 seals off the flow rather than opening the flow.

Valve body 7 has a ring of locking hooks 14 for receiving sealing device 13, the locking hooks 14 initially being spread open during insertion of the sealing device 13, in order to snap back when the sealing device 13 has arrived in its final position. By this means, sealing device 13 is satisfactorily fixed in position in valve body 7 in a simple manner.

A filter can be placed upon inlet connection 4, for example, by slip-fitting.

When the valve 100 is open, valve body 7 deflects the medium entering space 6 via inlet connection 4 from an axial flow into a radial flow. To keep further flow losses low, outlet connection 5 is arranged in a plane 15 that is offset in parallel with respect to valve seat 12. In principle, however, a reversed flow-through of the valve 100 is also possible, establishing a broad field of application possibilities.

In the open state, an annular bead 16 arranged on the side of valve body 7 facing coil 2 comes in contact with the coil 2 and protects a gap 17 situated between pole-plate core 3a of magnet armature 3 and tappet 8 against the penetration of impurities.

Figure 4:
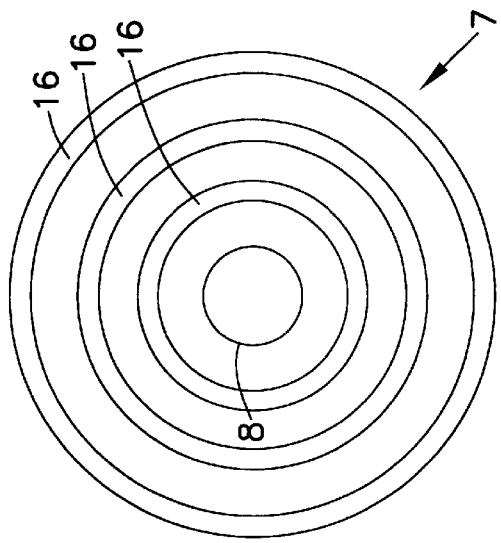
FIG. 4 shows a top view of the valve body according to a third embodiment of the invention.
Figure 3:
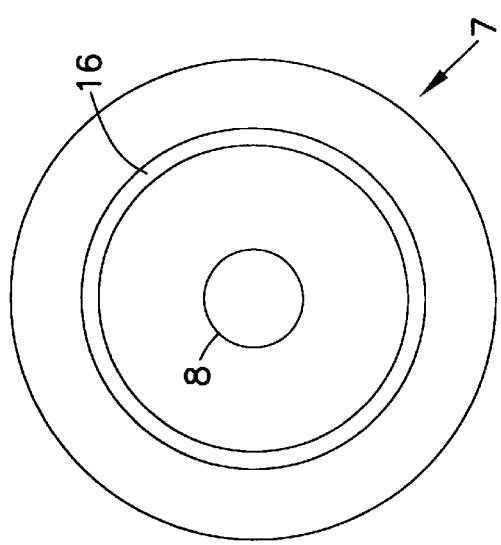
FIG. 3 shows a top view of the valve body according to a second embodiment of the invention.
Figure 2:
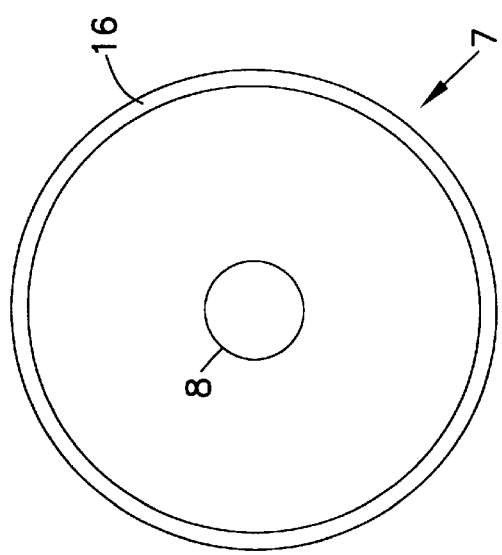
FIG. 2 shows a top view of the valve body according to a first embodiment of the invention.

The annular bead 16 in the exemplary embodiment is a rim bead as shown in FIG. 2, but an annular bead can also be situated closer to tappet 8 as shown in FIG. 3. Optionally, a plurality of annular beads can be provided to realize a labyrinth seal as shown in FIG. 4. Bead 16 is preferably arranged at a greater radial distance to the axis-of-motion 18 of magnet armature 3 than the armature guide-region.

Simultaneously with the annular gap 17, receptacle 10 for end 9 of valve tappet 8 is also protected by bead 16 against the penetration of impurities.

What is claimed is:

1. An electromagnetic valve having a first open position and a second closed position, the electromagnetic valve comprising:

a housing;

a coil located in the housing;

a magnet armature guided within the coil; and a spring-actuated valve body interacting via a tappet with the magnet armature, the valve body having a first side facing the coil, and having a bead disposed on the first side, wherein, when the valve is in the first open position, the bead comes in contact with the coil.

2. An electromagnetic valve having a first open position and a second closed position, the electromagnetic valve comprising:

a housing, a coil located in the housing;

a magnet armature guided within the coil; and a spring-actuated valve body interacting via a tappet with the magnet armature, the tappet being integrally joined to the valve body on the first side of the valve body and having an end that is crowned, the valve body having a first side facing the coil, and having a bead disposed on the first side, wherein, when the valve is in the first open position, the bead comes in contact with the coil.

3. The electromagnetic valve according to claim 2, wherein the magnet armature has a socket-like receptacle for the end of the tappet.

4. The electromagnetic valve according to claim 1 wherein the valve body has an outside diameter and the tappet has a length that is less than half the outside diameter of the valve body.

5. The electromagnetic valve according to claim 1 wherein the tappet is centrally arranged and guided in the magnet armature.

6. The electromagnetic valve according to claim 1 further comprising a sealing device that can be snapped into place on the valve body.

7. The electromagnetic valve according to claim 1 further comprising:

a valve seat that defines a plane;

an inlet connection; and an outlet connection;

wherein at least one of the inlet connection or the outlet connection is arranged in the plane defined by the valve seat.

8. The electromagnetic valve according to claim 1 further comprising:

a valve seat that defines a plane;

an inlet connection; and an outlet connection;

wherein at least one of the inlet connection or the outlet connection is arranged in a plane offset in parallel from the plane defined by the valve seat.

9. The electromagnetic valve according to claim 1 wherein the bead is located at a rim of the first side of the valve body.

10. The electromagnetic valve according to claim 1 wherein the bead is located on the first side of the valve body between the tappet and a rim of the valve body.

11. The electromagnetic valve according to claim 1 wherein the valve body includes a plurality of annular beads on the first side of the valve body.

* * * * *